United States Patent
Yang et al.

(10) Patent No.: US 10,878,117 B2
(45) Date of Patent: *Dec. 29, 2020

(54) TIME OF FLIGHT SENSING FOR PROVIDING SECURITY AND POWER SAVINGS IN ELECTRONIC DEVICES

(71) Applicants: STMicroelectronics, Inc., Coppell, TX (US); STMicroelectroincs (Research & Development) Limited, Marlow (GB)

(72) Inventors: Xiaoyong Yang, San Jose, CA (US); Rui Xiao, San Jose, CA (US); Duncan Hall, Edinburgh (GB)

(73) Assignees: STMicroelectronics, Inc., Coppell, TX (US); STMicroelectronics (Research & Development) Limited, Marlow (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/356,344

(22) Filed: Mar. 18, 2019

(65) Prior Publication Data

US 2019/0213348 A1 Jul. 11, 2019

Related U.S. Application Data

(63) Continuation of application No. 15/475,908, filed on Mar. 31, 2017, now Pat. No. 10,275,610.

(Continued)

(51) Int. Cl.
*G06F 21/32* (2013.01)
*G06K 9/00* (2006.01)

(Continued)

(52) U.S. Cl.
CPC ......... *G06F 21/6218* (2013.01); *G01S 7/484* (2013.01); *G01S 7/4861* (2013.01);

(Continued)

(58) Field of Classification Search
CPC .... G06F 21/6218; G06F 21/32; G01S 7/4865; G01S 7/4861; G01S 7/484; G01S 17/88;

(Continued)

(56) References Cited

U.S. PATENT DOCUMENTS

| 4,623,237 A | 11/1986 | Kaneda et al. |
| 5,291,560 A | 3/1994 | Daugman |

(Continued)

FOREIGN PATENT DOCUMENTS

WO 01/50179 A1 7/2001

OTHER PUBLICATIONS

"LASER Safety Manual," University of Washington, Radiation Safety Office, Environmental Health and Safety, Aug. 2007, 27 pages.

*Primary Examiner* — Jon Chang
(74) *Attorney, Agent, or Firm* — Seed Intellectual Property Law Group LLP

(57) ABSTRACT

An electronic device includes a time-of-flight sensor configured to sense a distance between the electronic device and at least one object proximate the electronic device. Processing circuitry is coupled to the time-of-flight sensor and controls access to the electronic device based on the sensed distance. The electronic device may include a digital camera that the processing circuitry controls to perform facial or iris recognition utilizing the sensed distance from the time-of-flight sensor.

20 Claims, 10 Drawing Sheets

Related U.S. Application Data

(60) Provisional application No. 62/426,989, filed on Nov. 28, 2016.

(51) Int. Cl.
*G01S 17/10* (2020.01)
*G01S 17/88* (2006.01)
*G01S 7/484* (2006.01)
*G01S 7/4861* (2020.01)
*G01S 7/4865* (2020.01)
*G01S 7/497* (2006.01)
*G06F 21/62* (2013.01)
*G01S 7/4863* (2020.01)

(52) U.S. Cl.
CPC ............ *G01S 7/4865* (2013.01); *G01S 17/10* (2013.01); *G01S 17/88* (2013.01); *G06F 21/32* (2013.01); *G06K 9/00201* (2013.01); *G06K 9/00255* (2013.01); *G06K 9/00268* (2013.01); *G06K 9/00597* (2013.01); *G01S 7/4863* (2013.01); *G01S 7/497* (2013.01)

(58) Field of Classification Search
CPC ........ G01S 17/10; G01S 7/497; G01S 7/4863; G06K 9/00597; G06K 9/00268; G06K 9/00255; G06K 9/00201
See application file for complete search history.

(56) References Cited

U.S. PATENT DOCUMENTS

| | | | |
|---|---|---|---|
| 5,699,149 A | 12/1997 | Kuroda et al. | |
| 6,710,859 B2 | 3/2004 | Shirai et al. | |
| 7,193,690 B2 | 3/2007 | Ossig et al. | |
| 7,508,496 B2 | 3/2009 | Mettenleiter et al. | |
| 7,969,558 B2 | 6/2011 | Hall | |
| 8,675,181 B2 | 3/2014 | Hall | |
| 8,925,814 B1 | 1/2015 | Schneider et al. | |
| 9,709,678 B2 | 7/2017 | Matsuura | |
| 10,274,588 B2 * | 4/2019 | Smits .................. G01S 7/484 |
| 10,275,610 B2 * | 4/2019 | Yang .................. G06K 9/00201 |
| 2002/0071126 A1 | 6/2002 | Shirai et al. | |
| 2004/0135992 A1 | 7/2004 | Munro | |
| 2007/0145136 A1 | 6/2007 | Wiklof et al. | |
| 2009/0262760 A1 | 10/2009 | Krupkin et al. | |
| 2009/0273770 A1 | 11/2009 | Bauhahn et al. | |
| 2009/0275841 A1 | 11/2009 | Melendez et al. | |
| 2010/0096459 A1 | 4/2010 | Gurevich | |
| 2010/0100202 A1 | 4/2010 | Chen et al. | |
| 2010/0250189 A1 | 9/2010 | Brown | |
| 2011/0001957 A1 | 1/2011 | Braune et al. | |
| 2011/0304842 A1 | 12/2011 | Kao et al. | |
| 2012/0294422 A1 | 11/2012 | Cheung et al. | |
| 2013/0063611 A1 | 3/2013 | Papakipos et al. | |
| 2013/0236171 A1 | 9/2013 | Saunders | |
| 2014/0077086 A1 | 3/2014 | Batkilin et al. | |
| 2014/0240317 A1 | 8/2014 | Go et al. | |
| 2014/0253688 A1 * | 9/2014 | Metz .................. G01B 11/026 348/46 |
| 2015/0003691 A1 | 1/2015 | Joo et al. | |
| 2015/0083900 A1 | 3/2015 | Caley et al. | |
| 2015/0310452 A1 | 10/2015 | Baitch et al. | |
| 2016/0003944 A1 | 1/2016 | Schmidtke et al. | |
| 2016/0033644 A1 | 2/2016 | Moore | |
| 2016/0080709 A1 | 3/2016 | Viswanathan et al. | |
| 2016/0232408 A1 | 8/2016 | Lee et al. | |
| 2016/0337863 A1 * | 11/2016 | Robinson .............. H04W 4/021 |
| 2017/0038459 A1 | 2/2017 | Kubacki et al. | |
| 2017/0067734 A1 | 3/2017 | Heidemann et al. | |
| 2017/0303789 A1 | 10/2017 | Tichauer et al. | |
| 2017/0356981 A1 | 12/2017 | Yang et al. | |
| 2018/0131449 A1 | 5/2018 | Kare et al. | |
| 2018/0341009 A1 * | 11/2018 | Niclass .................. G01S 17/42 |

\* cited by examiner

TIME OF FLIGHT SENSING FOR PROVIDING SECURITY AND POWER SAVINGS IN ELECTRONIC DEVICES

BACKGROUND

Technical Field

The present disclosure relates generally to time of flight sensing and more specifically to the utilization of time of flight sensing to provide security and power savings for electronic devices.

Description of the Related Art

Current mobile electronic devices such as laptop computers, tablet computers and smart phones increasingly provide a variety of different ways of controlling access to the electronic device in addition to conventional password access control. Many such devices, for example, now utilize iris recognition, facial recognition, or both, to authenticate a user and either provide or deny access of the user to the electronic device. Current iris and facial recognition systems typically utilize an iterative process with the electronic device providing feedback to the user so that the user may properly position his or her face to allow the recognition system to operate properly. For example, the electronic device displays user feedback as to the position of the user's face relative to the electronic device and provides the user an indication when the position of the user's face relative to the electronic device, including the distance from the electronic device, is proper so that the recognition system may begin capturing images to authenticate the user. As a result, current iris and facial recognition systems may result in a relatively slow and cumbersome process of authenticating the user due to the time required to properly position the users face relative to the electronic device and the subsequent computation to process captured images once the positioning is proper. This is particularly true in low light conditions during which a camera of the recognition system captures the images required for recognition at a lower rate (i.e., fewer frames per second).

In addition to security relating to providing or denying access to mobile electronic devices, security concerns may also arise due to the portable nature of such mobile electronic devices and the different environments in which these devices are utilized. For example, mobile electronic devices are commonly utilized in public settings such as in a coffee shop, a restaurant, a semi-public workshare type location, and so on. In these settings privacy concerns may also arise in relation to the content that a user of the mobile electronic device is viewing on a visual display of the device. The visual display of a mobile electronic device may in these settings be capable of being seen by a number of people seated at an adjacent table or otherwise proximate the user and his or her mobile electronic device. Moreover, the location of the setting or environment in which the user is utilizing his or her mobile electronic device may result in a higher likelihood that people proximate the user in the environment may be from competitor companies, such where the user is in a coffee shop in Silicon Valley or a city such as Seattle with a large number of high-tech and startup companies.

Yet another issue that arises for users of mobile electronic devices relates to the security of the device itself when in a public setting or environment. A laptop computer, for example, typically locks when a display of the computer is closed to prevent an unauthorized person from physically taking the computer and thereby gaining access to the computer. A person in such a public environment certainly does not want his or her mobile laptop computer to be stolen but may be much more concerned about a thief gaining access to the contents of that laptop computer than the computer itself. A sensor, such as a Hall sensor, is utilized in many laptop computers to sense the opening and closing of the display. Such sensors are inexpensive but may not reliably detect the closing of the display of the laptop computer. As a result, closing the display may not result in locking or preventing access to the computer until a person provides the required authentication information. In addition to locking the laptop computer closing the display also typically turns OFF the computer or places the computer in a low-power mode of operation upon detecting the closing of the display. Thus, if the sensor does not reliably detect the closing of the display the computer may not be turned off or placed in a low-power mode of operation, which results in unwanted power consumption and reduced battery life when the computer is under battery power.

There is a need for improving the security of mobile electronic devices and reducing the power consumption of such devices.

BRIEF SUMMARY

In one embodiment of the present disclosure, an electronic device includes a time-of-flight sensor configured to sense a distance between the electronic device and at least one object proximate the electronic device. Processing circuitry is coupled to the time-of-flight sensor and controls access to the electronic device based on the sensed distance. The electronic device may include a digital camera that the processing circuitry controls to perform facial or iris recognition utilizing the sensed distance from the time-of-flight sensor.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
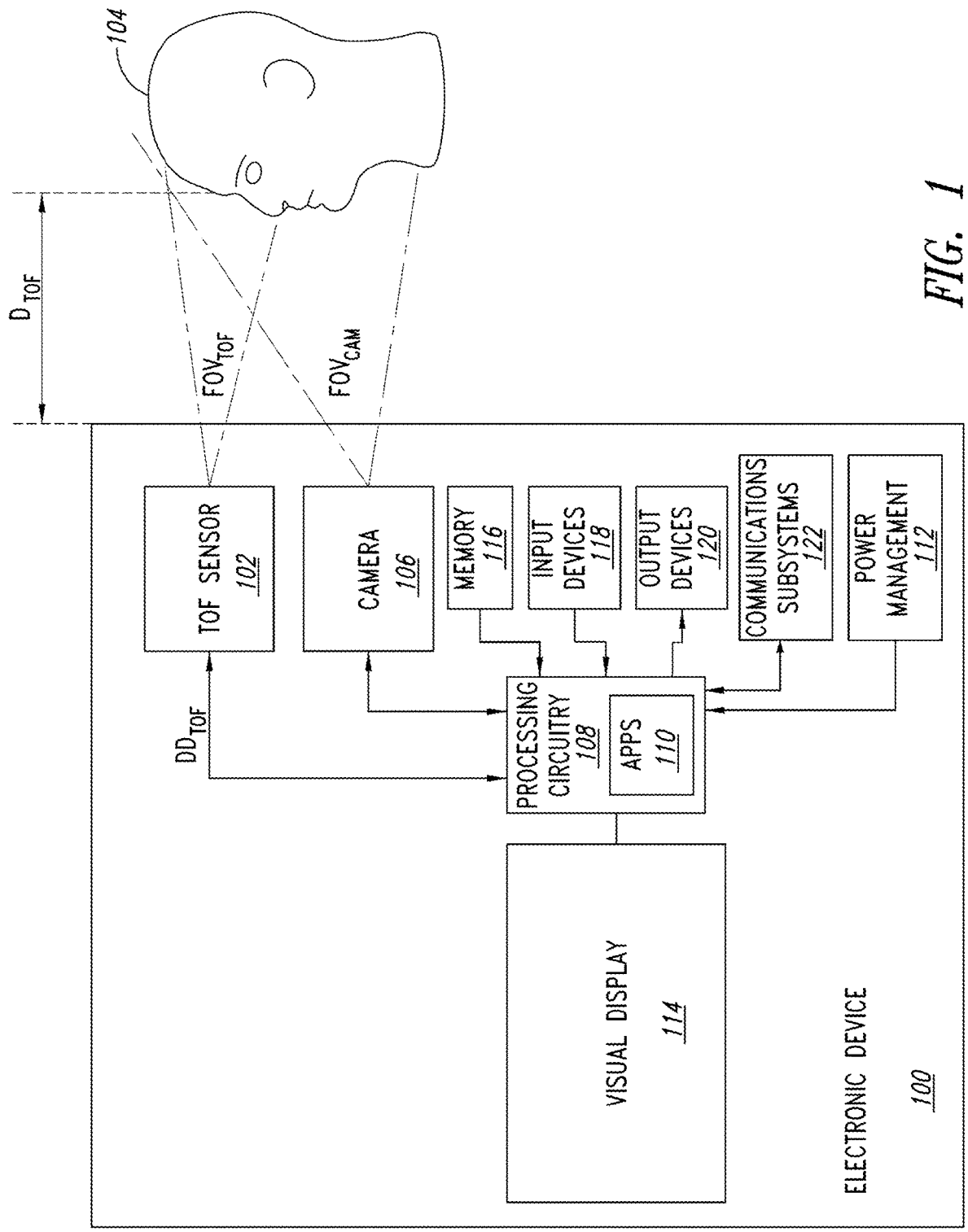
FIG. 1 is a functional block diagram of an electronic device including a time-of-flight (TOF) sensor that is utilized in providing security and power savings for the electronic device according to one embodiment of the present disclosure.

FIG. 1 is a functional block diagram of an electronic device 100 including a time-of-flight (TOF) sensor 102 that detects a distance $D_{TOF}$ between the electronic device and a person 104 according to one embodiment of the present disclosure. In one embodiment, the detected distance $D_{TOF}$ is utilized in controlling a digital camera 106 in the electronic device 100 as part of authenticating the person 104 attempting to gain access to the electronic device, such as through facial or iris recognition, as will be explained in more detail below. In some embodiments, the distance $D_{TOF}$ detected by the TOF sensor 102 is utilized in detecting closure of a lid of the electronic device 100 where the device is a laptop computer, and in locking access to the laptop computer in response to detecting closure of the lid along with placing the laptop computer in a low power mode of operation, as will be described in more detail below with reference to FIGS. 5A, 5B and 6. In still further embodiments, the TOF sensor 102 detects respective distances $D_{TOF}$ to multiple objects such as multiple people that are proximate the electronic device 100 and in this way provides privacy-related security for a user of the electronic device in public environments, as will be described in more detail below with reference to FIGS. 6-8.

In the following description, certain details are set forth in conjunction with the described embodiments to provide a sufficient understanding of the present disclosure. One skilled in the art will appreciate, however, that the subject matter of the present disclosure may be practiced without these particular details. Furthermore, one skilled in the art will appreciate that the example embodiments described below do not limit the scope of the present disclosure to the disclosed embodiments, and will also understand that various modifications, equivalents, and combinations of such embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes have not been shown or described in detail below to avoid unnecessarily obscuring the present disclosure.

The electronic device 100 in the example embodiment of FIG. 1 includes processing circuitry 108 that controls the overall operation of the electronic device and also executes applications or "apps" 110 that provide specific functionality for a user of the electronic device. The electronic device 100 may be any type of electronic device, such as a smart phone, a tablet computer, a laptop computer, or other type of mobile electronic device, and may also be a non-mobile type of device such as a desktop computer. Some aspects of the present disclosure are particularly advantageous for use in mobile electronic devices in public or non-private settings, and thus in the embodiments of FIGS. 4A, 4B and 5-8 described below the electronic device 100 is assumed to be a laptop computer.

In FIG. 1, a power management subsystem 112 of the electronic device 100 is coupled to the processing circuitry 108, and would typically include a battery for powering the electronic device and also control circuitry for controlling power-related operating modes of the device such as charging of the battery, power-savings modes to extend battery life, and so on. The electronic device 100 further includes a visual display 114 such as a liquid crystal display (LCD) or a touch screen including a suitable touch visual display and a touch panel (not shown) attached to or formed as an integral part of the touch visual display. In operation, the where the visual display 114 is a touch screen, the touch screen senses touches of a user of the electronic device 100 and provides sensed touch information to the processing circuitry 108 to thereby allow the user to interface with and control the operation of the electronic device. The processing circuitry 108 also controls the touch screen 114 to display desired visual content on the touch visual display portion of the touch screen.

The electronic device 100 further includes data storage or memory 116 coupled to the processing circuitry 108 for storing and retrieving data including the apps 110 and other software executing on the processing circuitry and utilized by the electronic device 100 during operation. Examples of typical types of memory 116 include solid state memory such as DRAM, SRAM and FLASH, solid state drives (SSDs), and could also include any other types of memory suited to the desired functionality of the electronic device 100 including phase-change memory (PCM), digital video disks (DVDs), compact disk read-only (CD-ROMs), compact disk read-write (CD-RW) memories, magnetic tape, hard and floppy magnetic disks, tape cassettes, and so on. Input devices 118 are coupled to the processing circuitry 108 and may include a keypad, whether implemented through the visual display 114 where the display is a touch screen or separately, a pressure sensor, accelerometer, microphone, keyboard, mouse, and other suitable input devices. Output devices 120 are also coupled to the processing circuitry 108 and may include, for example, audio output devices such as a speaker, printers, vibration devices, and so on. The input devices 118 and output devices 120 collectively may include other types of typical communications ports for the electronic device 100, such as USB ports, HDMI ports, and so on. The electronic device 100 further includes communications subsystems 122 coupled to the processing circuitry 108 and which may include Wi-Fi, GPS, cellular and Bluetooth subsystems for providing the device with the corresponding communications functionality. The specific type and number of input devices 118, output devices 120, communications subsystems 122, and even the specific functionality of the power management subsystem 112 will of course depend on the specific type of the electronic device 100.

The processing circuitry 108 controls the overall operation of the electronic device 100 including authenticating the person 104 to determine whether that person is an authorized user that should be granted access to the electronic device or an unauthorized person to which access should be denied. In operation of authenticating the person 104, the TOF sensor 102 senses the distance $D_{TOF}$ between the electronic device 100 and the person 104 attempting to gain access to the electronic device. This may be initiated, for example, when the person 104 powers on the electronic device 100 in an attempt to gain access to the device. As will be described in more detail below with reference to FIG. 2, in sensing the distance $D_{TOF}$ to the person 104 the TOF sensor 102 transmits an optical pulse signal and then detects a time between transmission of this optical pulse signal and receipt of a portion of this transmitted optical pulse signal reflected off the person in the form of a returned optical pulse signal. The person 104 must be positioned within a field of view $FOV_{TOF}$ of the TOF sensor 102 for the sensor to properly illuminate the person with the transmitted optical pulse signal and sense the corresponding returned optical pulse signal reflected off the person.

The distance $D_{TOF}$ detected by the TOF sensor 102 is supplied to the processing circuitry 108 and is utilized by the processing circuitry in authenticating the person 104. The processing circuitry 108 utilizes the detected distance $D_{TOF}$ in determining whether and when to activate the digital camera 106 to capture an image of the face or iris of the person 104, as will be described in more detail below. As with the TOF sensor 102, the person 104 must be positioned within a field of view $FOV_{CAM}$ of the camera 106 to enable the camera to properly capture an image of the face or Iris of the person being authenticated. The camera 106 provides the captured image of the person 104 to the processing circuitry 108 which, in turn, utilizes the captured image and the sensed distance D TOF in authenticating the user, as will also be described in more detail below.

If authenticated, the processing circuitry 108 will grant the person 104 access to the electronic device 100. Conversely, if the processing circuitry 100 does not authenticate the person 104, meaning that person is not an authorized user of the electronic device 100, the processing circuitry denies the person access to the electronic device. The processing circuitry 108 would also in this situation typically provide some sort of feedback to the person 104 on the visual display 114 regarding this determination, such as displaying a message to the person like "Access denied. User not authenticated." Other embodiments of the present disclosure utilizing the detected distance D TOF from the TOF sensor 102 will be described in more detail below.

Figure 2:
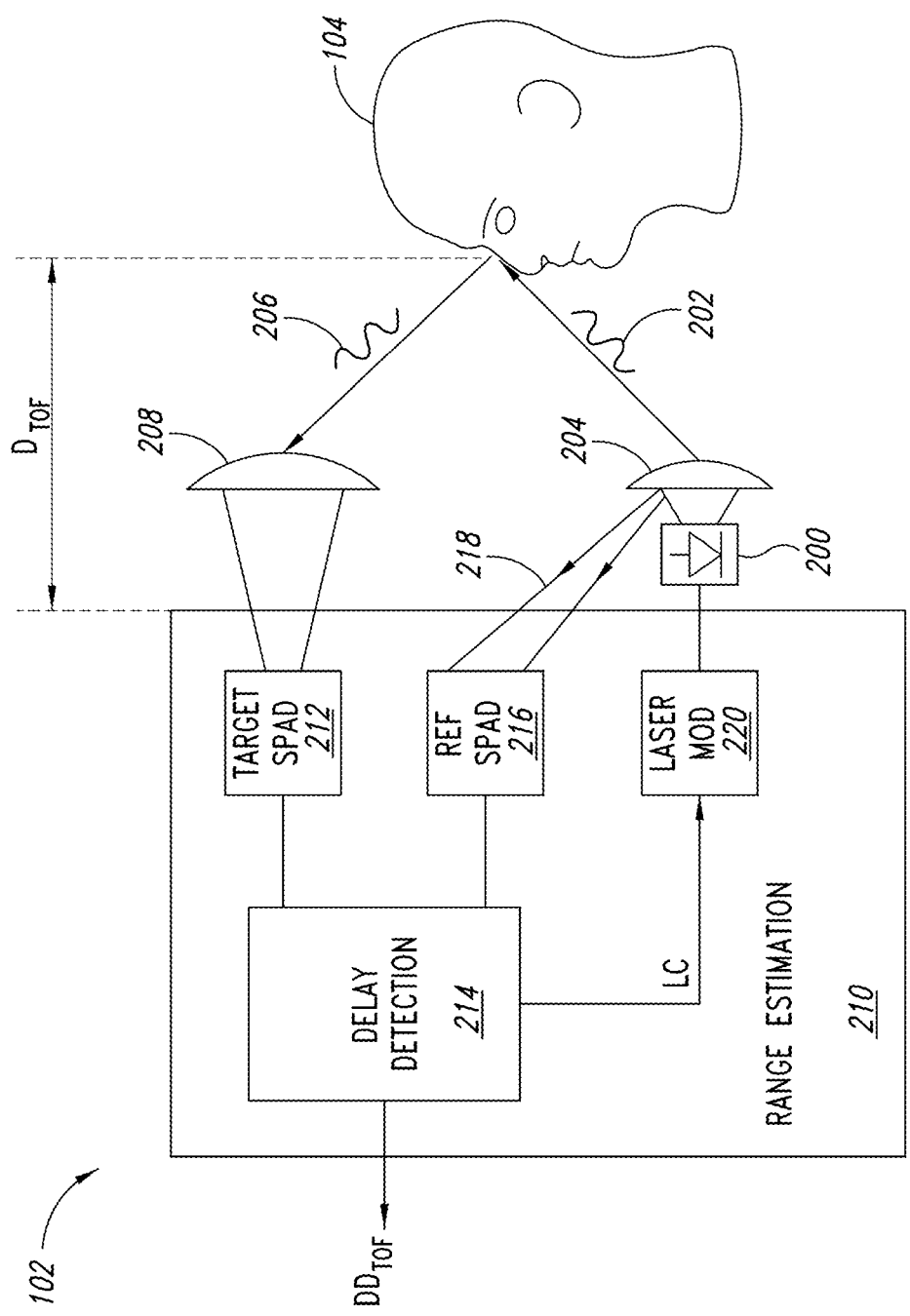
FIG. 2 is a more detailed functional block diagram of the TOF sensor of FIG. 1 according to one embodiment of the present disclosure.

Before describing embodiments of the present disclosure in more detail, the TOF sensor 102 will first be discussed in more detail with reference to FIG. 2, which is a more detailed functional block diagram of the TOF sensor 102 of FIG. 1 according to one embodiment of the present disclosure. In the embodiment of FIG. 2, the TOF sensor 102 104 includes a light source 200, which is, for example, a laser diode such as a vertical-cavity surface-emitting laser (VCSEL) for generating the transmitted optical pulse signal designated as 202 in the figure. The transmitted optical pulse signal 202 is transmitted into the field of view $FOV_{TOF}$ through a projection lens 204. The reflected or returned optical pulse signal is designated as 206 in the figure and corresponds to a portion of the transmitted optical pulse signal 202 that is reflected off the person 104 back to the TOF sensor 102. The returned optical pulse signal 206 is received through a reflection lens 208 in the TOF sensor 102. The lens 208 directs the reflected optical pulse signal 206 to range estimation circuitry 210 for estimating the imaging distance $D_{TOF}$ between TOF sensor 102 and the projection surface 104, as previously discussed generally with reference to FIG. 1. The range estimation circuitry 210 includes a target single-photon avalanche diode (SPAD) array 212, which receives the returned optical pulse signal 206 via the lens 208. The target SPAD array 212 typically includes large number of SPAD cells (not shown in FIG. 2), each cell including a SPAD for sensing a photon of the reflected optical pulse signal 206. In some embodiments of the TOF sensor 102, the lens 208 directs reflected optical pulse signals 206 from certain spatial zones within the field of view $FOV_{TOF}$ to certain groups of SPAD cells or zones of SPAD cells in the target SPAD array 212, as will be described in more detail below with respect to alternative embodiments of the present disclosure.

Each SPAD cell in the SPAD array 212 will provide an output pulse or SPAD event when a photon in the form of the returned optical pulse signal 206 is detected by that cell in the target SPAD array 212. A delay detection circuit 214 determines a delay time between the transmitted optical pulse signal 202 and a SPAD event from the SPAD array 212, which corresponds to the return of the reflected optical pulse signal 206 to the SPAD array. In this way, by detecting these SPAD events an arrival time of the return or reflected optical pulse signal 206 can be estimated. The delay detection circuit 214 determines the time of flight based upon the difference between the transmission time of the transmitted optical pulse signal 202 and the arrival time of the returned optical pulse signal 206 as sensed by the SPAD array 212. From the determined time of flight, the delay detection circuit 214 generates a detected distance signal $DD_{TOF}$ indicating the detected distance $D_{TOF}$ between the person 104 and the TOF sensor 102.

A reference SPAD array 216 senses the transmission of the transmitted optical pulse signal 202 generated by the light source 200. The reference SPAD array 216 receives an internal reflection 218 from the lens 204 of a portion of the transmitted optical pulse signal 202 upon transmission of the transmitted optical pulse signal from the light source 200. The reference SPAD array 216 effectively receives the internal reflection 218 of the transmitted optical pulse signal 202 at the same time the transmitted optical pulse signal is transmitted. In response to this received internal reflection 218, the reference SPAD array 216 generates a corresponding SPAD event indicating the transmission of the transmitted optical pulse signal 202. The delay detection circuit 214 includes suitable circuitry, such as time-to-digital converters or time-to-analog converters, to determine a time or time-of-flight TOF between the transmission of the transmitted optical pulse signal 202 and receipt of the reflected optical pulse signal 208. The delay detection circuit 214 then utilizes this determined time-of-flight TOF to determine the distance $D_{TOF}$ between the person 104 and the TOF sensor 102, which is assumed to be the same as the distance between the person and the electronic device 100. The range estimation circuit 210 further includes a laser modulation circuit 220 that drives the light source 200. The delay detection circuit 214 generates a laser control signal LC that is applied to the laser modulation circuit 220 to control activation of the laser 200 and thereby control generation of the transmitted optical pulse signal 202.

Figure 3A:
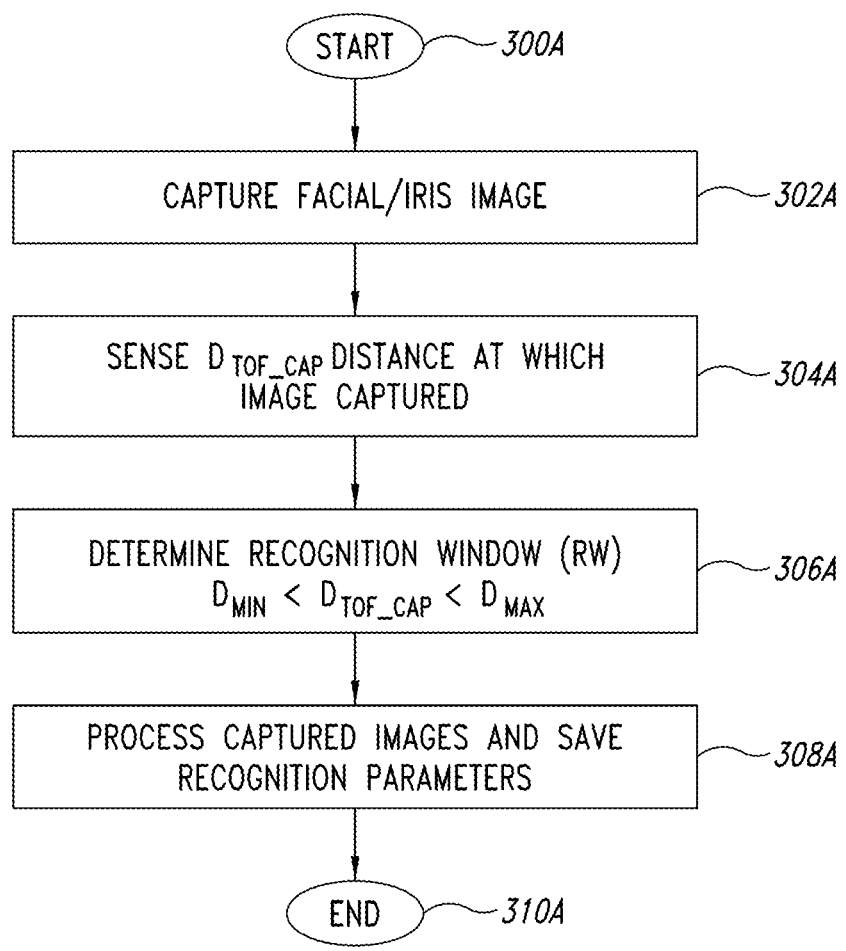
FIG. 3A is a flowchart showing initialization of a facial/iris recognition process for the electronic device of FIG. 1 utilizing a distance sensed by the TOF sensor according to one embodiment of the present disclosure.

FIG. 3A is a flowchart showing initialization of a facial/iris recognition process for the electronic device 100 of FIG. 1 utilizing a distance $D_{TOF}$ sensed by the TOF sensor 102 according to one embodiment of the present disclosure. This process will now be described with reference to FIGS. 1 and 3A. In the embodiment of FIG. 3A, the process starts in step 300A and then proceeds to step 302A in which a user of the electronic device 100 captures through the digital camera 106 an image or images of the user's face or iris depending on whether the recognition process is utilizing facial or iris recognition. The process then proceeds to step 304A and the TOF sensor 102 senses a capture distance $D_{TOF\_CAP}$ at which the image or images of step 302A were captured. The capture distance $D_{TOF\_CAP}$ thus indicates the distance between the person 104 and the electronic device 100 when the image or images of step 302A were captured. From step 304A, the process proceeds to step 306A and the processing circuitry 108 determines a recognition window RW based on a resolution of the digital camera 106 and optics components of this digital camera.

The recognition window RW indicates a range of permissible distances around the capture distance $D_{TOF\_CAP}$ at which the person 104 may be positioned from the electronic device 100 when the camera 106 is capturing images to authenticate the person, as will be described in more detail with reference to FIG. 3B. The recognition window RW is defined by a minimum distance $D_{MIN}$ and a maximum distance $D_{MAX}$ at which the person 104 may be positioned from the electronic device 100 when the camera 106 is capturing images for authentication purposes. These minimum and maximum distances $D_{MIN}$ and $D_{MAX}$ thus define a range or window around the capture distance $D_{TOF\_CAP}$ at which the initial images of step 302A were captured, namely ($D_{MIN} < D_{TOF\_CAP} < D_{MAX}$). Ideally future images captured by the digital camera 106 for authenticating the person 104 would be captured at the same distance as the initial images captured in step 302A, namely at the capture distance $D_{TOF\_CAP}$. In reality, however, these future images captured by the camera 106 for authentication purposes will be captured at a distance at least slightly different from the capture distance $D_{TOF\_CAP}$. The recognition window RW defined by the minimum and maximum distances $D_{MIN}$ and $D_{MAX}$ thus defines a permissible range around the capture distance $D_{TOF\_CAP}$ at which these future images may be captured and utilized by the processing circuitry 108 to reliably authenticate the person 104.

After determination of the recognition window RW in step 306A, the process proceeds to step 308A and the processing circuitry 108 processes the initial image or images captured in step 302A to generate recognition parameters that will be utilized by the processing circuitry in authenticating the person 104 using subsequently captured images from the camera 106, as will be described in more detail below with reference to FIG. 3B. These recognition parameters include the capture distance $D_{TOF\_CAP}$ along with the minimum and maximum distances $D_{MIN}$ and $D_{MAX}$ defining the recognition window RW. In step 308A these recognition parameters are saved by the processing circuitry 108 in the memory 116 of FIG. 1, and then from step 308A the initialization process proceeds to step 310A and terminates.

Figure 3B:
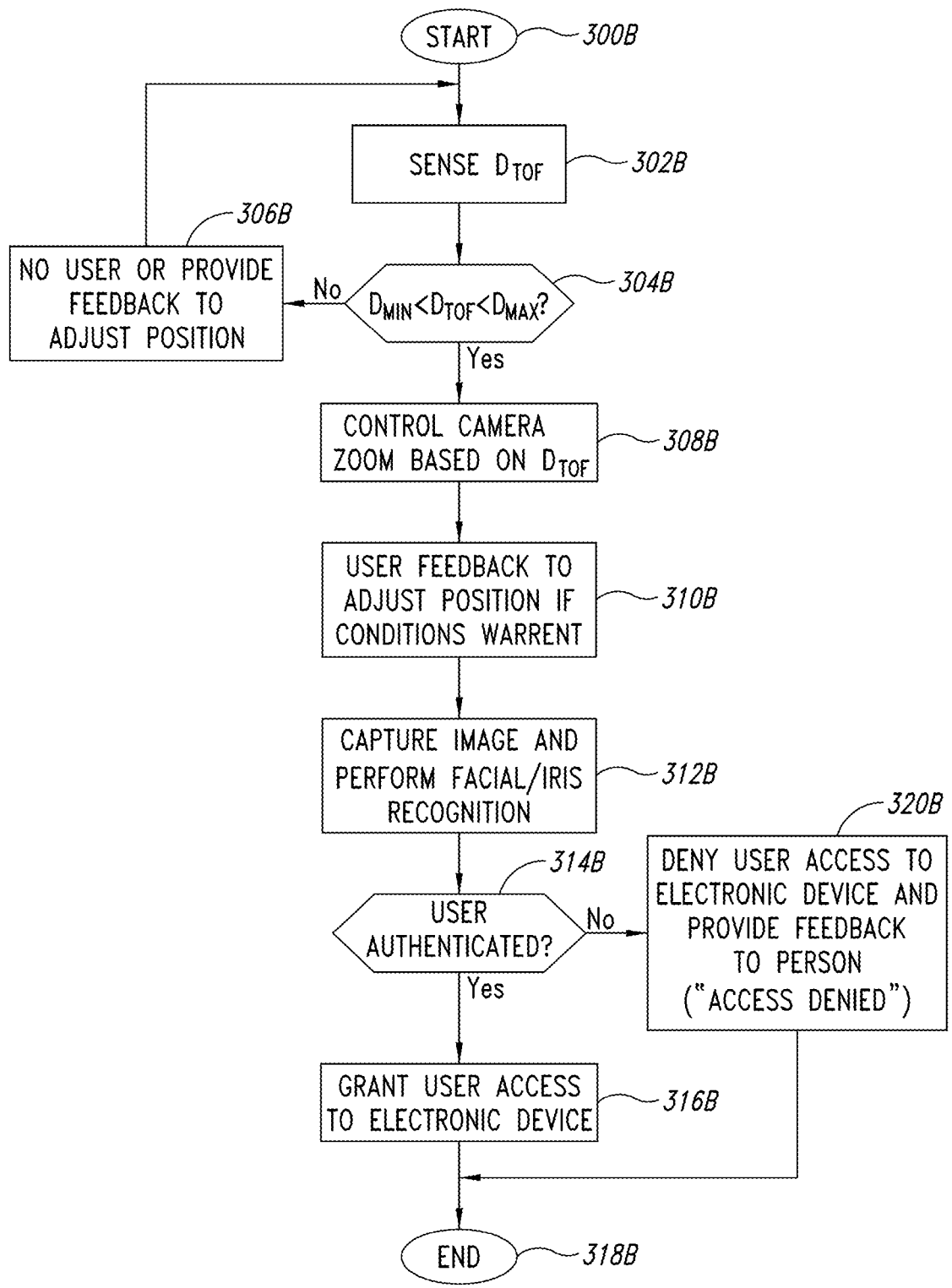
FIG. 3B is a flowchart showing a facial/iris recognition process for the electronic device of FIG. 1 after the initialization process of FIG. 3A and again utilizing the distance sensed by the TOF sensor according to one embodiment of the present disclosure.

FIG. 3B is a flowchart showing a facial/iris recognition process for the electronic device 100 of FIG. 1 after the initialization process of FIG. 3A has been performed. The recognition process of FIG. 3B starts at step 300B and proceeds to step 302B and the TOF sensor 102 again senses the distance $D_{TOF}$ between the person 104 and the electronic device 100. The processing circuitry 108 may periodically activate the TOF sensor 102 to periodically sense the distance $D_{TOF}$ or may wait until a person 104 attempts to access the electronic device 100 before activating the TOF sensor.

From step 302B, the process proceeds to step 304B and the processing circuitry 108 determines whether the $DD_{TOF}$ signal from the TOF sensor 102 indicating the detected distance $D_{TOF}$ to the person 104 is within the recognition range RW, namely ($D_{MIN} < D_{TOF\_CAP} < D_{MAX}$). If the determination in step 304B is negative, the process goes to step 306B and the processing circuitry 108 may either determine no person 104 is present proximate the electronic device 100 or may provide visual feedback to the person through the visual display 114 to have that person adjust his or her distance from the electronic device. When the detected distance $D_{TOF}$ to the person 104 is very large or otherwise indicates no person is present proximate the electronic device 100, the processing circuitry 108 in step 306B may then place the electronic device 100 in a low-power mode of operation. The processing circuitry 108 delays a certain period of time before returning to step 302B and again activating the TOF sensor 102 to sense whether a person 104 is present proximate the electronic device. Alternatively, if the detected distance $D_{TOF}$ indicates a person 104 is present even though step 304B has determined the person is not within the permissible recognition range RW, the processing circuitry 108 may provide visual feedback to the person based upon the detected distance. For example, where the detected distance $D_{TOF}$ is less than the minimum distance $D_{MIN}$ the processing circuitry provides a message on the visual display 114 instructing the person 104 to move back away from the electronic device 100 in an attempt to increase the detected distance so that the person is positioned within the permissible recognition range RW. Conversely, where the detected distance $D_{TOF}$ is greater than the maximum distance $D_{MAX}$ the processing circuitry 108 provides a message on the visual display 114 instructing the person 104 to move towards from the electronic device 100. From the step 306B, the process proceeds back to step 302B.

When the determination in step 304B is positive, this indicates the person 104 is positioned within the permissible recognition range RW from the electronic device 100. In this situation, the process proceeds from step 304B to step 308B and the processing circuitry 108 adjusts operating characteristics of the digital camera 106 based upon the detected distance $D_{TOF}$ of the person 104 in anticipation of capturing images of the person as part of the authentication process. The processing circuitry 108 may, for example, adjust the zoom of the digital camera 106 based upon the detected distance $D_{TOF}$ relative to the capture distance $D_{TOF\_CAP}$ at which initialization images of an authorized user were previously captured as discussed above with reference to FIG. 3A. This is done so that the image or images about to be captured by the digital camera 106 have characteristics that allow them to be reliably compared to the initially captured images from the initialization process of FIG. 3A.

From step 308B the process proceeds to step 310B in which the processing circuitry 108 may once again provide visual feedback to the person 104 through the visual display 114 if conditions in the environment containing the electronic device 100 and the person 104 necessitate further adjustment of the position of the person. For example, high or low levels of ambient light in a room containing the electronic device 100 and person 104 may require further adjustment of the position of the person for the digital camera 106 to capture sufficient images of the person. Thus, the step 310B may include the processing circuitry 108 again activating the TOF sensor 102 to sense the detected distance $D_{TOF}$ of the person 104 and provide feedback to the person through the visual display 114 to properly position the person for the capture of images by the digital camera 106.

Once the person 104 is properly positioned in step 310B, the process proceeds to step 312B and the processing circuitry 108 controls the digital camera 106 to capture an image or images of the person. The processing circuitry 108 then utilizes these captured images to make a determination as to whether the person 104 has been authenticated, meaning the person is the authorized user corresponding to the person who's images were captured during the initialization process of FIG. 3A. From step 312B, the process proceeds to step 314B and the processing circuitry 108 proceeds based on whether the person 104 has been authenticated or not. When the user or person 104 has been authenticated, the determination in step 314B is positive and the process proceeds to step 316B in which the processing circuitry grants the user access to the electronic device 100 since the person has been authenticated. The process then proceeds to step 318B and terminates. When the determination in step 314B is negative, which indicates the person 104 has not been authenticated and is thus not an authorized user of the electronic device 100, the process proceeds to step 320B and the processing circuitry 108 denies the person access to the electronic device. The processing circuitry 108 also in step 320B would typically provide the person 104 with suitable visual feedback on the visual display 114 letting the person know that they are not an authorized user of the electronic device 100. A suitable message such as "access denied" could be provided on the visual display 114 in such a situation. From step 320B the process again proceeds to step 318B and terminates.

Figure 4:
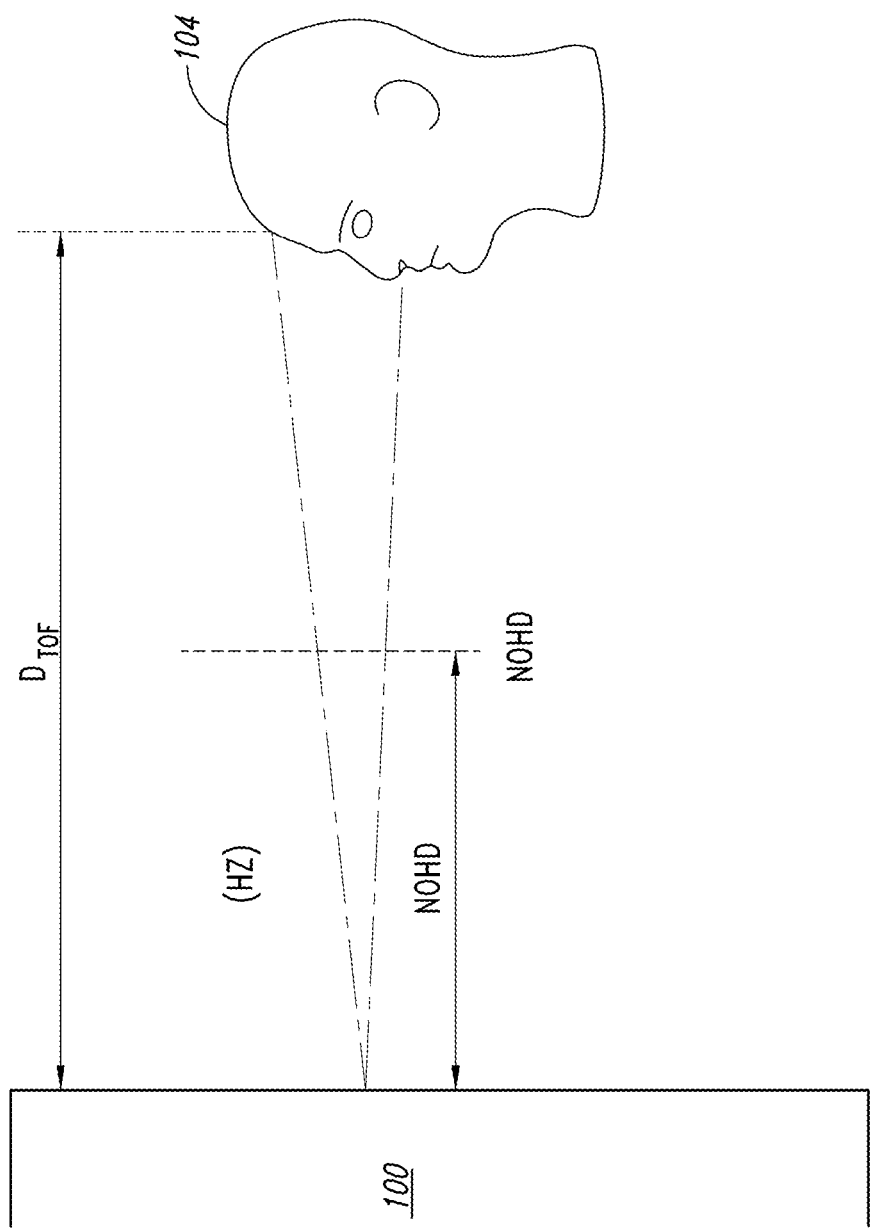
FIG. 4 is a diagram illustrating a nominal ocular hazard distance associated with the laser in the TOF sensor of FIG. 2.

FIG. 4 is a diagram illustrating a nominal ocular hazard distance associated with the light source 200 in the TOF sensor 102 of FIG. 2. As previously mentioned, the light source 200 is typically a laser such as a laser diode and thus in the situation where facial or iris recognition is being implemented, particularly iris recognition, the TOF sensor 102 may be providing transmitted optical pulse signals 202 that illuminate an eye of the person 104 being authenticated. Depending upon the power of the laser 200 this could, of course, be a dangerous situation, with the transmitted optical pulse signals 202 possibly damaging the eye of the person 104. A distance known as the Nominal Ocular Hazard Distance (NOHD) is the minimum distance at which it is safe to view a given laser beam with the human eye. The radiance of a laser beam (power per unit area) falls below and accessible admission limit AEL at the NOHD and thus will not damage the human eye at the NOHD from the source of the laser beam and greater distances.

FIG. 4 illustrates an example of the NOHD for the laser 200 of the TOF sensor 102. In the figure, the person 104 is at a safe distance from the electronic device 100 because the distance $D_{TOF}$ between the person 104 and the electronic device 100 is greater than the NOHD. As illustrated in the figure, a hazard zone HZ corresponding to distance is less than the NOHD exists and in this hazard zone illumination of the eye of the person 104 by the laser 200 could cause damage to the eye. Thus, in one embodiment of the processes of FIGS. 3A and 3B, the processing circuitry 108 also provides feedback to the person 104 if the detected distance $D_{TOF}$ from the TOF sensor 102 indicates the person is in the hazard zone HZ. This could be visual feedback on the visual display 114, or audible feedback through a speaker that is one of the output devices 120, or both.

Figure 5A:
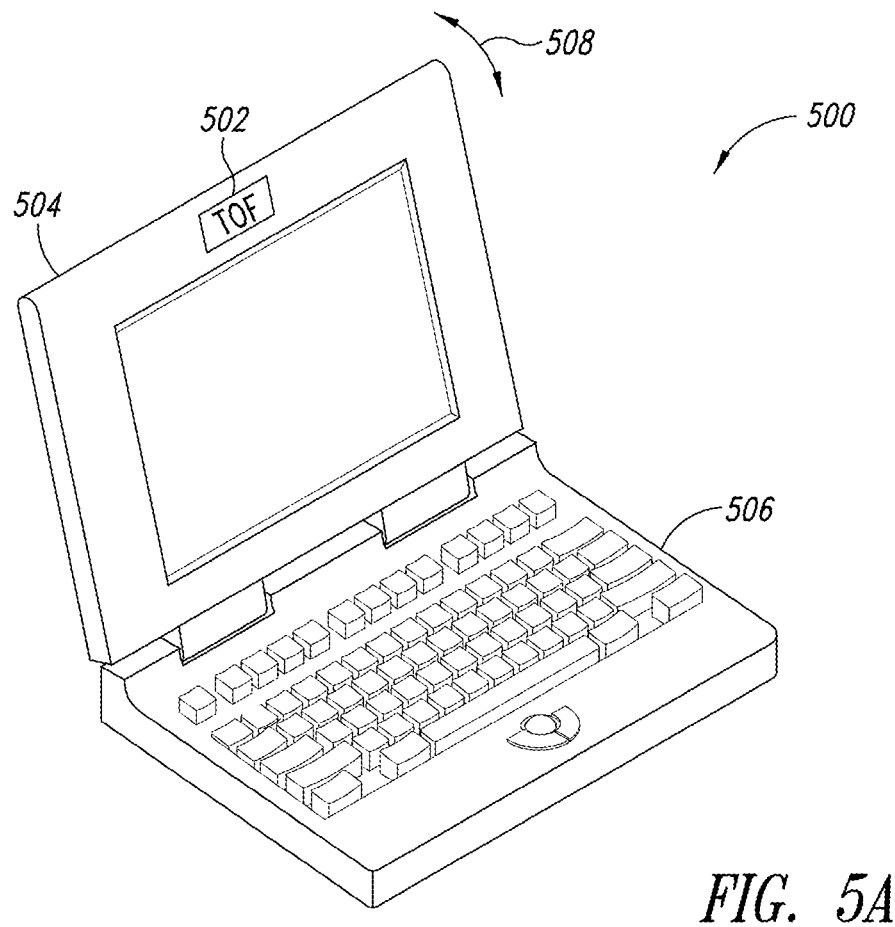
FIG. 5A is a perspective view of a laptop computer including a TOF sensor within the lid of the laptop computer for detecting closure of the lid to lock out access to the computer and implement a power saving mode of operation according to another embodiment of the present disclosure.
Figure 5B:
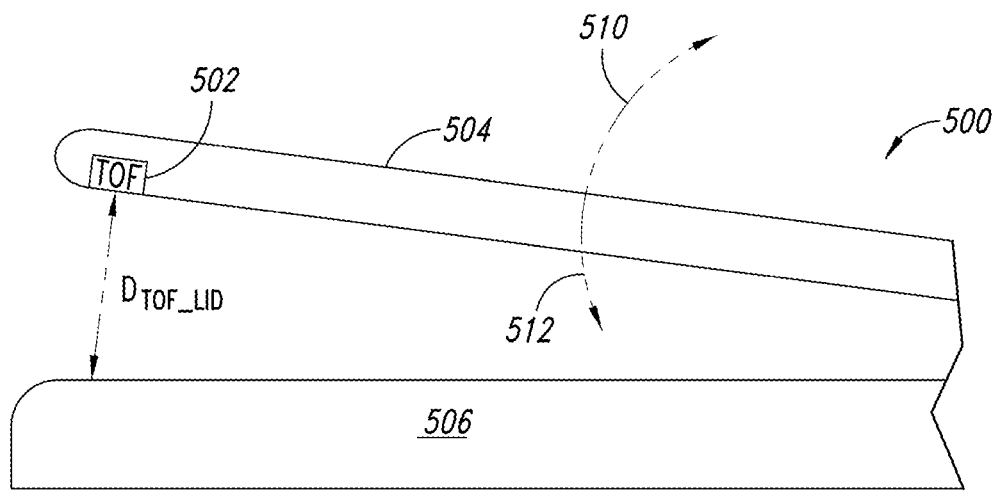
FIG. 5B is a partial cross-sectional view of the laptop computer of FIG. 5A illustrating operation of the TOF sensor of FIG. 2 in detecting closure of the lid of the laptop computer.

FIG. 5A is a perspective view of a laptop computer 500 including a TOF sensor 502 within a lid 504 of the laptop computer for detecting closure of the lid to lock out access to the laptop computer and implement a power saving mode of operation according to another embodiment of the present disclosure. FIG. 5B is a partial cross-sectional view of the laptop computer 500 of FIG. 5A illustrating a distance $D_{TOF\_LID}$ between the lid 504 and a base 506 of the laptop computer 500. The TOF sensor 502 senses the distance $D_{TOF\_LID}$ and this distance is utilized in detecting closure of the lid 504 of the laptop computer 500, as will now be described in more detail. In the embodiment of FIGS. 5A and 5B, the laptop computer 500 is one example of the electronic device 100 with the TOF sensor 502 corresponding to the TOF sensor 102 of FIG. 1. Instead of sensing the distance $D_{TOF}$ between a person 104 and the electronic device 100 as does the TOF sensor 102, however, the TOF sensor 502 senses the distance $D_{TOF\_LID}$ between the lid 504 and base 506 of the laptop computer 500 as previously mentioned. The TOF sensor 502 is shown positioned in a center top portion of the lid 504 opposite the base 506 but may be positioned in other locations on the lid or even on the base in other embodiments.

The sensed distance $D_{TOF\_LID}$ is utilized in detecting the closure of the lid 504 and blocking access to the laptop computer 500 upon detecting a closure, and to place the laptop computer in a low-power mode of operation, as will now be described in more detail with reference to the flowchart of FIG. 6. The distance $D_{TOF\_LID}$ will obviously become smaller as the lid 504 is being closed and will be at a minimum when the lid has been closed. A bi-directional arrow 508 in FIG. 5A represents the opening and closing of the lid 504 as the lid is rotated about an axis at the edge of the lid that is attached to the base 506. In FIG. 5B, and arrow 510 represents the direction of the opening of the lid 504 while an arrow 512 represents the direction of the closing of the lid. Thus, as seen in FIG. 5B the distance $D_{TOF\_LID}$ between the lid 504 and the base 506 decreases as the lid is being closed and thus rotated in the direction 512 towards the base. The lid 504 is closed when the lid is rotated in the direction 512 as far as possible to be in contact with the base 506, as will be appreciated by those skilled in the art, and when in this position the distance $D_{TOF\_LID}$ sensed by the TOF sensor 502 will be a minimum.

Figure 6:
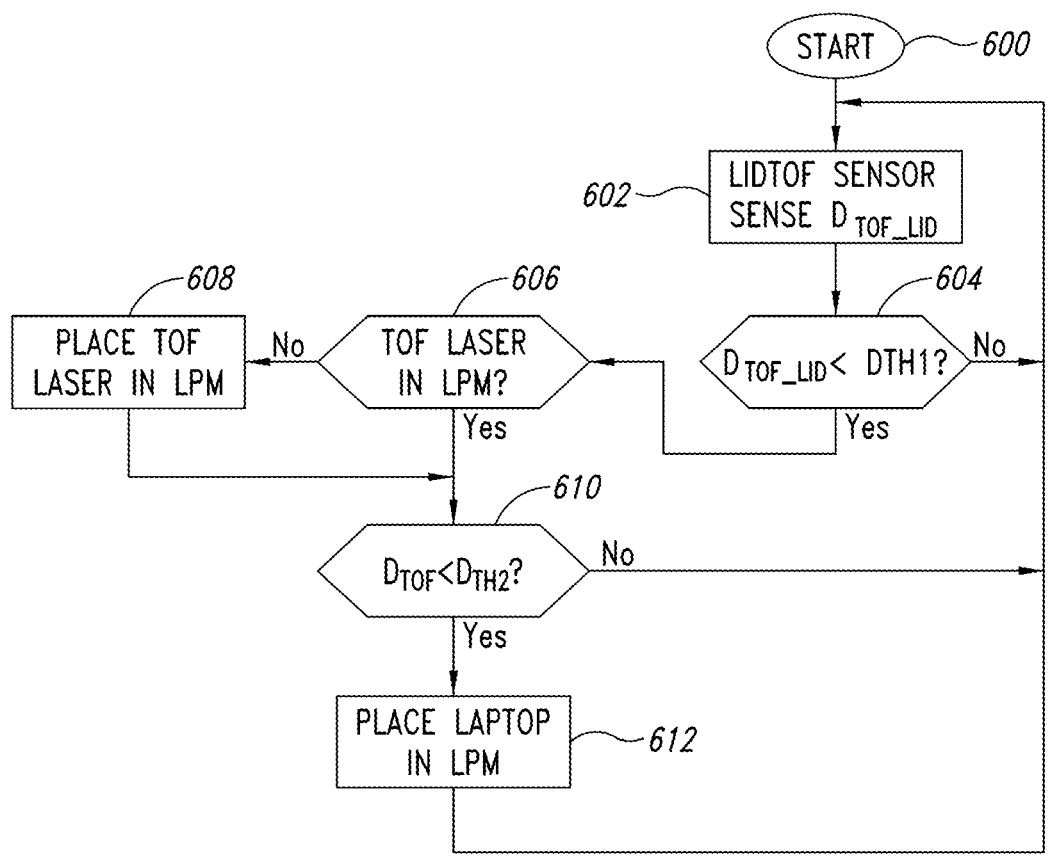
FIG. 6 is a flowchart illustrating a process implemented in the laptop computer of FIGS. 5A and 5B in detecting closure of the lid of the laptop and entering a power saving mode of operation according to one embodiment of the present disclosure.

FIG. 6 is a flowchart illustrating a process implemented in the laptop computer 500 to detect closure of the lid 504 and enter a power saving mode of operation according to another embodiment of the present disclosure. As previously mentioned, the laptop computer 500 is one example of the electronic device 100 of FIG. 1 and thus the laptop computer includes processing circuitry corresponding to the processing circuitry 108 of the electronic device, with this processing circuitry of the laptop computer operating in combination with the TOF sensor 502 to implement the process of FIG. 6. The process of FIG. 6 starts in step 600 and proceeds to step 602 in which the TOF sensor 502 senses the distance $D_{TOF\_LID}$ between the lid 504 and the base 506.

From step 602 the process proceeds to step 604 and determines whether the distance $D_{TOF\_LID}$ is less than a first threshold DTH1. This first threshold DTH1 is a lower distance threshold to compensate for nonlinearities in the distance $D_{TOF\_LID}$ by the TOF sensor 502 as this sensed distance become smaller. For example, where the TOF sensor 502 includes a VCSEL as the light source 200 nonlinearities in the distance sensed by the sensor may occur once the distance is approximately 15 millimeters or smaller. These nonlinearities in the detected distance may be improved by lowering the power of the optical signal generated by the VCSEL as the distance sensed by the TOF sensor 502 become smaller. As a result, when the sensed distance $D_{TOF\_LID}$ is less than the first threshold DTH1 (DTH1=15 mm, e.g.), the process proceeds to step 606 and determines whether the light source 200 of the TOF sensor 502, which is assumed to be a VCSEL in the current example, is already operating in a low-power mode LPM. If the determination in step 606 is negative the process proceeds to step 608 and places the VCSEL 200 in the TOF sensor 502 into the low-power mode LPM to improve the linearity of the sensed distance $D_{TOF\_LID}$.

From step 608 the process proceeds to step 610 and determines whether the sensed distance $D_{TOF\_LID}$ is less than a second threshold DTH2 that is smaller than the first threshold DTH1. The second threshold DTH2 has a value corresponding to the lid 504 being closed. Thus, when the determination in step 610 is negative, indicating that the sensed distance $D_{TOF\_LID}$ is not less than the second threshold DTH2 and thus the lid 504 is not closed, the process goes back to step 602 and the TOF sensor 502 once again detects the distance $D_{TOF\_LID}$. Conversely, when the determination in step 610 is positive this indicates the sensed distance $D_{TOF\_LID}$ is less than the second threshold DTH2 and thus the lid 504 has been closed. In this situation, the process proceeds from step 610 to step 612 and the laptop computer 500 is placed into a low-power mode LPM of operation.

As previously discussed, conventional laptop computers typically utilize a Hall-effect sensor placed in the lid or base of a laptop computer to detect closure of the lid and these sensors, while inexpensive, may not reliably detect closure of the lid of a laptop computer. The TOF sensor 502 can more reliably detects closure of the lid 504 to thereby more reliably lock and prevent access to the laptop computer 500 until a person provides required authentication information to access the computer. In addition, because the TOF sensor 502 more reliably detects closure of the lid 504, the laptop computer 500 is more reliably placed in the low-power mode LPM of operation, reducing unwanted power consumption by the laptop computer and thereby extending battery life of a battery in the laptop computer.

Figure 7A:
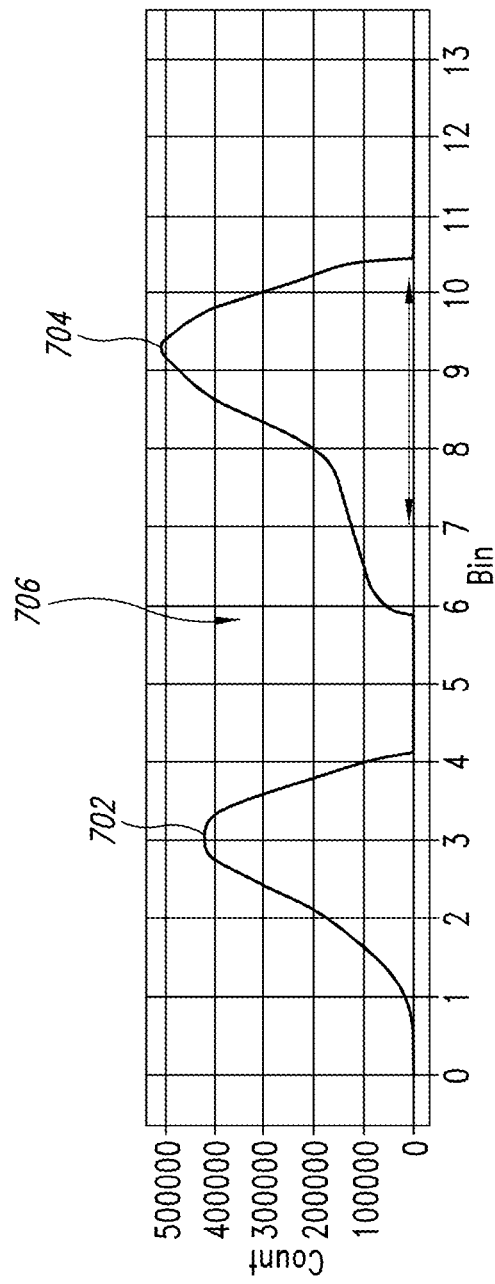
FIGS. 7A and 7B are graphs illustrating operation of the TOF sensor of FIG. 2 in detecting multiple objects within a field of view of the TOF sensor to thereby provide privacy-related security for a user of the electronic device in public environments according to yet another embodiment of the present disclosure.
Figure 7B:
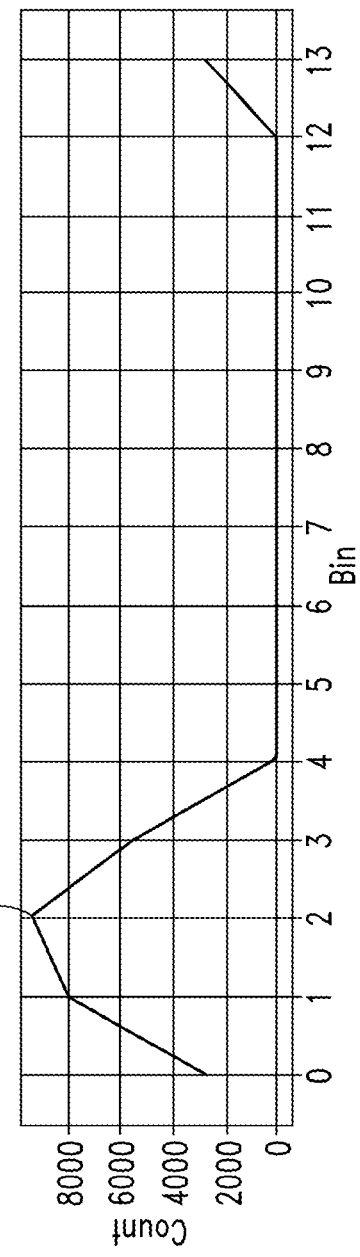

FIGS. 7A and 7B are graphs illustrating operation of the TOF sensor 102 of FIG. 2 in detecting multiple objects within a field of view of the TOF sensor 102 to thereby provide privacy-related security for a user of the electronic device 100 in public environments according to yet another embodiment of the present disclosure. The graphs of FIGS. 7A and 7B are signal diagrams showing a number of counts along a vertical axis and time bins along a horizontal axis. The number of counts indicates a number of SPAD events that have been detected in each bin, as will be described in more detail below. These figures illustrate operation of a histogram based ranging technique by the TOF sensor 102 of FIGS. 1 and 2 according to this embodiment of the present disclosure. This histogram based ranging technique allows the TOF sensor 102 to sense or detect multiple objects within the $FOV_{TOF}$ of the TOF sensor, and detection of these multiple objects is used in providing privacy-related security in a public environment for the electronic device 100, as will now be described in more detail.

In this histogram based ranging technique, more than one SPAD event is detected each cycle of operation, where a transmitted optical pulse signal 202 is transmitted each cycle. SPAD events are detected by the target SPAD array 212 and reference SPAD array 216, where a SPAD event is an output pulse provided by the array indicating detection of a photon. Each SPAD array 212 and 216 typically includes a plurality of cells (not shown in FIG. 2). Each cell in the SPAD arrays 212 and 216 will provide an output pulse or SPAD event when a photon is received in the form of the returned optical pulse signal 206 for target SPAD array 212 and internal reflection 218 of the transmitted optical pulse signal 202 for the reference SPAD array 216. By monitoring these SPAD events an arrival time of the optical signal 216 or 218 that generated the pulse can be estimated. Each detected SPAD event during each cycle is allocated to a particular bin, where the bin is a time period in which the SPAD event was detected. Thus, each cycle is divided into a plurality of bins and a SPAD event detected or not for each bin during each cycle. Detected SPAD events are summed for each bin over multiple cycles to thereby form a histogram in time as shown in FIG. 8 for the received or detected SPAD events.

FIGS. 7A and 7B illustrate this concept over a cycle. Multiple cells in each of the SPAD arrays 212 and 216 may detect SPAD events in each bin, with the count of each bin indicating the number of such SPAD events detected in each bin over a cycle. FIG. 7B illustrates this concept for the internal reflection 218 of the transmitted optical pulse signal 202 as detected by the reference SPAD array 216. The sensed counts (i.e., detected number of SPAD events) for each of the bins shows a peak 700 at about bin 2 with this peak being indicative of the transmitted optical pulse signal 202 being transmitted. FIG. 7A illustrates this concept for the reflected optical pulse signal 206, with there being two peaks 702 and 704 at approximately bins 3 and 9. These two peaks 702 and 704 (i.e., detected number of SPAD events) indicate the occurrence of a relatively large number of SPAD events in the bins 3 and 9, which indicates reflected optical pulse signals 206 reflecting off a first object causing the peak at bin 3 and reflected optical pulse signals reflecting off a second object at greater distance than the first object causing the peak at bin 9. A valley 706 formed by a lower number of counts between the two peaks 702 and 704 indicates no additional detected objects between the first and second objects. Thus, the TOF sensor 102 is detecting two objects, such as two people, within the $FOV_{TOF}$ of the sensor in the example of FIGS. 7A and 7B. The two peaks 702 and 704 in FIG. 7A are shifted to the right relative to the peak 700 of FIG. 7B due to the time-of-flight of the transmitted optical pulse signal 202 in propagating from the TOF sensor 102 to the two objects within the $FOV_{TOF}$ but at different distances from the TOF sensor.

Figure 8:
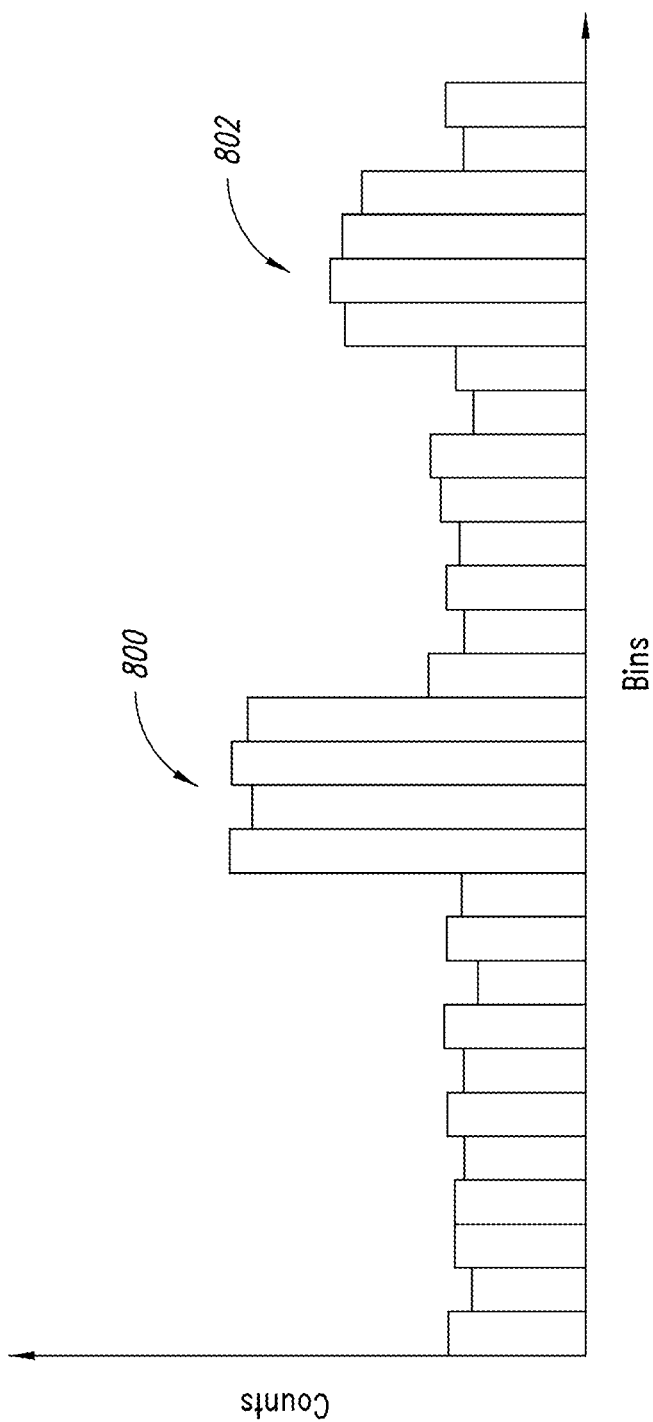
FIG. 8 is a histogram generated by the TOF sensor in the embodiment of FIG. 7 which provides detected distance information for multiple objects within the field of view of the TOF sensor.

FIG. 8 illustrates a histogram generated by TOF sensor 102 over multiple cycles. The height of the rectangles for each of the bins along the horizontal axis represents the count indicating the number of SPAD events that have been detected for that particular bin over multiple cycles of the TOF sensor 102. As seen in the histogram of FIG. 8, two peaks 800 and 802 are again present, corresponding to the two peaks 702 and 704 in the single cycle illustrated in FIG. 7A. From the histogram of FIG. 8, either the TOF sensor 102 itself or the processing circuitry 108 (FIG. 1) then determines a distance $D_{TOF}$ to each of the first and second objects in the $FOV_{TOF}$ of the TOF sensor. The processing circuitry 108 then monitors the multiple detected objects over time to provide the privacy-related security for a user of the electronic device 100 in public environments, as will be described in more detail below with reference to FIG. 9.

The TOF sensor 102 may also detect SPAD events in the target SPAD array 212 generated by background or ambient light in the environment containing the electronic device 100. This ambient light is not indicative of the distance between the electronic device 100 and the object within the of the TOF sensor 102, and the TOF sensor utilizes this detected ambient light (e.g., a histogram generated when no transmitted optical pulse signals 202 are transmitted) to adjust detected SPAD events over cycles of operation. Thus, the histogram output by the TOF sensor 102 of FIG. 8 would be adjusted based on this background or ambient light histogram to provide more reliable distancing information. A TOF sensor that generates histograms as discussed above for the TOF sensor 102 is discussed in more detail in U.S. patent application Ser. No. 14/734,138, which is incorporated herein by reference in its entirety.

Figure 9:
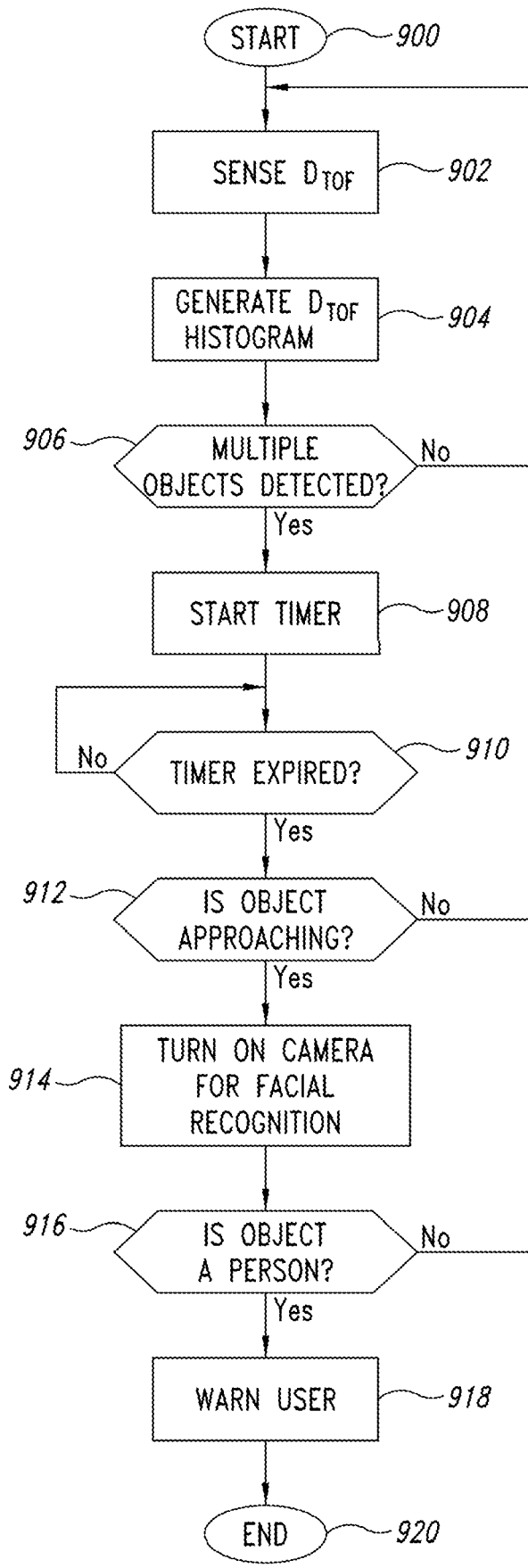
FIG. 9 is a flowchart illustrating operation of the electronic device of FIG. 1 in a providing a user of the electronic device with privacy-related security in a public environment based upon detection of multiple objects by the TOF sensor as illustrated in FIGS. 7A, 7B and 8 according to a further embodiment of the present disclosure.

FIG. 9 is a flowchart illustrating operation of the electronic device 100 of FIG. 1 in a providing a user of the electronic device with privacy-related security in a public environment based upon detection of multiple objects by the TOF sensor 102 as discussed with reference to FIGS. 7A, 7B and 8 according to another embodiment of the present disclosure. In FIG. 9, the process starts in step 900 and proceeds to step 902 in which the TOF sensor 102 senses the distance an object or multiple objects within the field of view $FOV_{TOF}$ of the sensor and proceeds to step 904 and generates a histogram as discussed above with reference to FIG. 8. From step 904 the process proceeds to step 906 and the processing circuitry 108 (FIG. 1) determines whether the histogram generated in step 904 indicates several objects are present within the field of view $FOV_{TOF}$ of the TOF sensor. The process of FIG. 9 is only required when multiple objects, and more specifically multiple persons, are present proximate the electronic device 100 within the field of view $FOV_{TOF}$ of the TOF sensor 102. As a result, if the determination is step 906 is negative, meaning the processing circuitry 108 has determined multiple objects are not present, then the process returns to step 902 and again executes steps 902-906 to continue monitoring for the detection of multiple objects.

When the determination in step 906 is positive, the processing circuitry 108 has processed the histogram from step 904 and determined that multiple objects are present within the field of view $FOV_{TOF}$ of the TOF sensor 102. In this situation, the process proceeds from step 906 to step 908 and starts a timer to start timing a period over which multiple histograms generated by the TOF sensor 904 are provided for processing to the processing circuitry 108. The processing circuitry 108 utilizes these histograms to determine whether one of the additional objects detected in step 906 is approaching the electronic device 100 and thereby warranting the processing circuitry perform additional processing to provide security for the authorized user of the electronic device 100. The timer is started in step 908 and in step 910 the process determines whether the time period being timed by the timer has lapsed or expired. During this time period being timed by the timer the processing circuitry 108 receives additional histograms generated by the TOF sensor 102. Once the period of the timer has expired, the determination in step 910 is positive and the process proceeds to step 912.

In step 912, the processing circuitry 108 processes the histograms provided by the TOF sensor 102 over the time period timed by the timer in steps 908 and 910 to monitor the detected objects over the time period to determine whether any of the detected objects are approaching the electronic device 100. For example, a person walking up from behind the authorized user while the user is viewing the visual display 114 of the electronic device 100 would typically be unnoticed by the authorized user and thus could present a security threat. In such a situation, the processing circuitry 108 would detect that this person is approaching the electronic device 100 and the process would then proceed to step 914 to take additional appropriate action, as will now be described in more detail.

When the determination in step 912 is positive, the process proceeds to step 914 and the processing circuitry 108 turns ON or activates the digital camera 106 to start capturing images for facial recognition of the multiple detected objects. One of the objects detected by the TOF sensor 102 is presumably an authorized user of the electronic device 100 since the process of FIG. 9 is executed after an authorized user has gained access to and is utilizing the electronic device. Thus, the object corresponding to the authorized user may be ignored. The distance of the authorized user from the electronic device 100 would typically not vary much over time and thus the processing circuitry 108 would not select such an object for facial recognition in step 914. Alternatively, as part of step 914 processing circuitry 108 could again process digital images from the camera 106 to verify that a particular detected object is the authorized user. In still another embodiment, the processing circuitry 108 could simply perform facial recognition on all of the multiple detected objects in step 914 to determine whether each of these objects is a person.

From step 914 the process proceeds to step 916 and the processing circuitry 108 determines whether any of the multiple objects detected by the TOF sensor 102 are people based on the facial recognition from step 914. If a detected object is not a person, then there is presumably not a concern about such an object even if that object is approaching the electronic device 100. For example, if the authorized user is using the electronic device 100 at an outdoor café and a vehicle is pulling into a parking spot behind the authorized user then such an object may be detected by the TOF sensor 102 but would not be of concern for security purposes since the object is not a person. This determination is made for each of the detected objects of interest in step 916. If none of the detected objects of interest, namely the detected objects approaching the electronic device 100 as determined in step 912, is a person then there is presumably no security risk for the authorized user and the process proceeds back to step 902 to keep periodically monitoring the environment in which the authorized user is utilizing the electronic device.

If the determination in step 916 is positive, then this indicates that at least one of the detected objects of interest is a person and this person or persons may therefore present a security risk to the authorized user. A person or persons walking up from behind the authorized user and viewing what is being displayed on the visual display 114 of the electronic device 100 fall into this category. As a result, when the determination in step 916 is positive the process proceeds to step 918 and the authorized user is in some way warned about the presence of a potential security risk. The processing circuitry 108 could, for example, provide text or an icon on the visual display 114 to warn the authorized user about such a situation. In this way, the authorized user would be made aware of the situation and may then determine whether any action need be taken. This would typically be preferable to the electronic device 100 automatically taking action in such situations since the specific circumstances may not warrant such action. The detected person or persons approaching the electronic device 100 from behind the authorized user could, of course, be known to the authorized user such as in a situation where the authorized user is showing this person or persons what is being displayed on the visual display 114. In this situation, it would not be desirable to automatically turn OFF the visual display 114 or electronic device 100 since there is no security risk. In other embodiments, however, as part of warning the authorized user in step 918 the processing circuitry 108 could automatically turn off the visual display 114, could power down the electronic device 100, or could log out the authorized user.

While in the present description embodiments are described including the TOF sensor 102 including SPAD arrays, the principles of the circuits and methods described herein for calculating a distance to objects could be applied to arrays formed of other types of photon detection devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device, comprising:
a time-of-flight sensor configured to activate a laser diode to generate an optical signal having a power and to sense a distance between the electronic device and at least one object proximate the electronic device based on the optical signal, and configured to adjust a power of the optical signal based on the sensed distance reaching a first threshold value; and
processing circuitry coupled to the time-of-flight sensor and configured to control access to the electronic device based on the sensed distance, the processing circuitry further configured to lock access to the electronic device based on the sensed distance reaching a second threshold value that is less than the first threshold value.

2. The electronic device of claim 1, wherein the processing circuitry comprises smart phone circuitry.

3. The electronic device of claim 2 further comprising:
a digital camera coupled to the processing circuitry and configured to capture a digital image of the at least one object proximate the electronic device; and
wherein the processing circuitry is configured to control the time-of-flight sensor and digital camera during an initialization process to cause the digital camera to capture at least one initial digital image of the at least one object and to perform facial recognition on the at least one initial digital image, and configured to generate facial recognition parameters for the at least one object when the at least one object is a face of an initial person, the facial recognition parameters being based upon the at least one initial digital image and the sensed distance to the face of the initial person when the at least one initial digital image was captured.

4. The electronic device of claim 3, wherein the processing circuitry is further configured to control the time-of-flight sensor, after the digital camera has captured the at least one initial digital image, to sense the distance of a face of a person and to determine whether the face of the person is within a range of the sensed distance of the face of the initial person when the digital camera captured the at least one initial digital image, and to provide feedback to the person if the face of the person is not within the range, and the processing circuitry further configured to adjust the operation of the digital camera based on the sensed distance of the face of the person and to cause the digital camera to capture at least one additional digital image of the face of the person, the processing circuitry configured to perform facial recognition on the at least one additional digital image and to authenticate the person based on the facial recognition and the recognition parameters and to provide access to the electronic device based upon the person being authenticated and to deny access to the electronic device based on the person not being authenticated.

5. The electronic device of claim 1, wherein the processing circuitry is further configured to place the smart phone circuitry into a low power mode of operation based upon the sensed distance reaching the second threshold.

6. The electronic device of claim 1, wherein the time-of-flight sensor is configured to sense the respective distances between a plurality of objects and the electronic device.

7. The electronic device of claim 6, wherein the processing circuitry is further configured to detect whether any of the plurality of objects is approaching the electronic device and to perform facial recognition on any of the plurality of objects detected as approaching the electronic device and to provide feedback to a user of the electronic device if the facial recognition indicates any of the plurality of objects is a person.

8. The electronic device of claim 1, wherein the time-of-flight sensor includes a laser diode.

9. The electronic device of claim 1, wherein the time-of-flight sensor comprises a target SPAD array and is configured to detect events in the target SPAD array generated by background or ambient light in an environment containing the electronic device.

10. A method providing security for a mobile electronic device, the method comprising:
sensing through time-of-flight measurement distances between one or more objects and the mobile electronic device;
generating a histogram based on the sensed distances;
determining whether the histogram indicates multiple objects have been sensed;
starting the timing of a timing period in response to determining multiple objects have been sensed;
generating multiple histograms during the timing period;
detecting the end of the timing period;
in response to detecting the end of the timing period, processing the multiple histograms to determine whether any of the multiple objects is approaching the mobile electronic device; and
controlling the mobile electronic device based on determining at least one of the multiple objects is approaching the mobile electronic device.

11. The method of claim 10, wherein controlling the mobile electronic device comprises:
activating a camera to capture images of the at least one of the multiple objects approaching the mobile electronic device;
performing facial recognition on the captured images for the at least one of the multiple objects approaching the mobile electronic device.

12. The method of claim 11, wherein processing the multiple histograms to determine whether any of the multiple objects is approaching the mobile electronic device comprises identifying one of the multiple objects as an authorized user and ignoring the one of the multiple objects corresponding to the authorized user when performing facial recognition.

13. The method of claim 12, wherein identifying one of the multiple objects as the authorized user comprises not selecting one of the multiple objects for facial recognition because the one of the multiple objects is not approaching the mobile electronic device.

14. The method of claim 11, wherein performing facial recognition on the captured images for the at least one of the multiple objects approaching the mobile electronic device comprises determining whether the at least one of the multiple objects approaching the mobile electronic device is a person.

15. The method of claim 14, further comprising ignoring any of the at least one of the multiple objects approaching the mobile electronic device that is determined not to be a person.

16. An electronic device, comprising:
a time-of-flight sensor configured to generate an optical signal having a power and to sense a distance between the electronic device and at least one object proximate the electronic device based on the optical signal, and further configured to adjust a power of the optical signal based on the sensed distance of the at least one object reaching a first threshold value;
a digital camera configured to capture digital images of the at least one object proximate the electronic device; and
processing circuitry coupled to the time-of-flight sensor and the digital camera and configured to control access to the electronic device based on captured digital images indicating a face of a person and the sensed distance between the electronic device and the at least one object, the processing circuitry further configured to lock access to the electronic device based on the sensed distance reaching a second threshold value that is less than the first threshold value.

17. The electronic device of claim 16, wherein the time-of-flight sensor includes a vertical-cavity surface-emitting laser configured to generate optical pulse signals to illuminate objects and includes a single-photon avalanche diode array to sense optical pulse signals reflected off illuminated objects.

18. The electronic device of claim 16, wherein the time-of-flight sensor comprises a target SPAD array and is configured to detect events in the target SPAD array generated by background or ambient light in an environment containing the electronic device.

19. The electronic device of claim 18, wherein the processing circuitry comprises smart phone circuitry.

20. The electronic device of claim 16, wherein the processing circuitry is further configured to control access to the electronic device independent of any of the at least one object for which the captured digital images do not indicate the face of a person.

* * * * *

UNITED STATES PATENT AND TRADEMARK OFFICE
CERTIFICATE OF CORRECTION

PATENT NO. : 10,878,117 B2  
APPLICATION NO. : 16/356344  
DATED : December 29, 2020  
INVENTOR(S) : Xiaoyong Yang et al.

It is certified that error appears in the above-identified patent and that said Letters Patent is hereby corrected as shown below:

On the Title Page

Item [71]:
"STMicroelectronics, Inc., Coppell, TX (US); STMicroelectroincs (Research & Development) Limited, Marlow (GB)"
Should read:
--STMicroelectronics, Inc., Coppell, TX (US); STMicroelectronics (Research & Development) Limited, Marlow (GB)--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*